United States Patent
Arnold et al.

(10) Patent No.: US 9,280,331 B2
(45) Date of Patent: Mar. 8, 2016

(54) HASH-BASED CHANGE TRACKING FOR SOFTWARE MAKE TOOLS

(71) Applicants: Gerald Arnold, Neuenhagen (DE); Henrik Hempelmann, Havelberg (DE)

(72) Inventors: Gerald Arnold, Neuenhagen (DE); Henrik Hempelmann, Havelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/274,244

(22) Filed: May 9, 2014

(65) Prior Publication Data

US 2015/0324178 A1      Nov. 12, 2015

(51) Int. Cl.
*G06F 9/44*      (2006.01)
*G06F 9/45*      (2006.01)

(52) U.S. Cl.
CPC ... *G06F 8/48* (2013.01); *G06F 8/71* (2013.01)

(58) Field of Classification Search
None
See application file for complete search history.

(56) References Cited

U.S. PATENT DOCUMENTS

| | | | | |
|---|---|---|---|---|
| 4,809,170 A * | 2/1989 | Leblang et al. | | 717/122 |
| 5,500,881 A * | 3/1996 | Levin et al. | | 717/141 |
| 5,574,898 A * | 11/1996 | Leblang et al. | | |
| 5,748,961 A * | 5/1998 | Hanna et al. | | 717/145 |
| 6,081,665 A * | 6/2000 | Nilsen | G06F 9/45504 | 717/118 |
| 6,457,170 B1 * | 9/2002 | Boehm et al. | | 717/106 |
| 6,721,721 B1 * | 4/2004 | Bates et al. | | |
| 6,865,675 B1 * | 3/2005 | Epstein | | 713/176 |
| 7,437,712 B1 * | 10/2008 | Brown et al. | | 717/122 |
| 7,539,976 B1 * | 5/2009 | Ousterhout | G06F 8/71 | 717/120 |
| 7,676,788 B1 * | 3/2010 | Ousterhout | G06F 8/71 | 717/120 |
| 7,877,461 B1 * | 1/2011 | Rimmer | H04L 63/0823 | 717/168 |
| 8,307,331 B2 * | 11/2012 | Warila | G06F 8/24 | 717/118 |
| 8,473,905 B1 * | 6/2013 | Takkallapally | G06F 9/4443 | 717/118 |
| 8,601,014 B2 * | 12/2013 | Mungi | G06F 17/30067 | 717/168 |
| 8,677,118 B1 * | 3/2014 | Liu | H04L 29/06 | 717/120 |
| 8,752,016 B2 * | 6/2014 | Hernandez Porras | G06F 8/47 | 717/168 |
| 8,819,659 B2 * | 8/2014 | Ramer | G06F 17/30398 | 717/168 |
| 8,997,076 B1 * | 3/2015 | Djabarov | H04L 63/029 | 717/168 |
| 2002/0055942 A1 * | 5/2002 | Reynolds | | 707/200 |
| 2002/0143808 A1 * | 10/2002 | Miller et al. | | 707/501.1 |

(Continued)

OTHER PUBLICATIONS

Cumming, "Rebuilding When a File's Checksum Changes"; 2006, www.cmcrossroads.com; [retrieved on May 12, 2015]; Retrieved from Internet <URL:http://www.cmcrossroads.com/print/article/rebuilding-when-files-checksum-changes>;pp. 1-4.*

(Continued)

*Primary Examiner* — Xi D Chen
(74) *Attorney, Agent, or Firm* — Brake Hughes Bellermann LLP

(57) ABSTRACT

A request handler may receive a request for a make operation for generating executable code from a plurality of source files and associated dependences there between, the source files and associated dependences having been previously utilized to generate a previous version of the executable code. A hash comparator may then determine, for a selected source file, that a current hash value corresponding to current content of the selected source file is different from a previous hash value corresponding to previous content of the selected source file during the previous utilization, whereupon the hash comparator may proceed to initiate execution of the make operation using the current content of the selected source file, based on the difference between the current hash value and the previous hash value.

15 Claims, 3 Drawing Sheets

(56) References Cited

U.S. PATENT DOCUMENTS

| | | | |
|---|---|---|---|
| 2003/0046681 A1* | 3/2003 | Barturen et al. | 717/177 |
| 2003/0182652 A1* | 9/2003 | Custodio | 717/122 |
| 2004/0194060 A1* | 9/2004 | Ousterhout | G06F 8/41 717/120 |
| 2006/0259896 A1* | 11/2006 | Hanson | G06F 8/20 717/118 |
| 2006/0259897 A1* | 11/2006 | Zorn | G06F 8/20 717/118 |
| 2007/0271552 A1* | 11/2007 | Pulley | G06F 8/60 717/120 |
| 2008/0021936 A1* | 1/2008 | Reynolds | 707/203 |
| 2008/0288783 A1* | 11/2008 | Jansen et al. | 713/189 |

OTHER PUBLICATIONS

Dolstra, "Secure Sharing Between Untrusted Users in a Transparent Source/Binary Deployment Model"; 2005 ACM; [retrieved on Nov. 13, 1015]; Retrieved from Internet <URL:http://dl.acm.org/citation.cfm?id=1101908.1101933>; pp. 154-163.*

Wang, et al., "Method to Implement Hash-Linking Based Content Integrity Service"; 2008 IEEE; [retrieved on Nov. 13, 1015]; Retrieved from Internet <URL:http://ieeexplore.ieee.org/stamp/stamp.jsp?tp=&arnumber=4637387>; pp. 24-27.*

Roberts, "Partial-Match Retrieval via the Method of Superimposed Codes"; 1979 IEEE; [retrieved on Nov. 13, 1015]; Retrieved from Internet <URL:http://ieeexplore.ieee.org/stamp/stamp.jsp?tp=&arnumber=1455812>; pp. 1624-1632.*

Jae Woo Lee et al., "Git Tutorial", retrieved from: http://www.cs.columbia.edu/~sedwards/classes/2013/4840/git-tutorial.pdf, Mar. 2013, 6 pages.

Joe Loeliger, "Version Control with Git", retrieved from: http://www.foo.be/cours/dess-20122013/b/OReilly%20Version%20Control%20with%20GIT.pdf, May 2009, 319 pages.

Perforce 2014.1: P4 User's Guide, retrieved from: http://www.perforce.com/perforce/doc.current/manuals/p4guide/p4guide.pdf, Mar. 2014, 128 pages.

"VMAKE Tools", retrieved from: http://help.sap.com/saphelp_erp60_sp/helpdata/en/9e/732cb3e87d11d4aa9a006094b92fad/content.htm, downloaded from the internet on May 9, 2014, 3 pages.

* cited by examiner

HASH-BASED CHANGE TRACKING FOR SOFTWARE MAKE TOOLS

TECHNICAL FIELD

This description relates to software make tools.

BACKGROUND

A make tool, also known as a build tool, generally refers to a software utility that is designed to construct executable code from relevant source code files, and associated dependencies therebetween. In other words, a make tool is designed to control a build process of a software application, including, e.g., collecting various source files, determining dependencies between the source files, triggering processing of the source files, and assembling intermediate or final target files, so as to provide executable code for the desired software application.

Given that many software applications, such as database-related applications, or business applications are extremely large and/or extremely complex, execution of a make tool in constructing executable code from available source files may be a time-consuming and resource-consuming process. Moreover, it is frequently necessary or desirable to modify an existing software application, such as when upgrading, maintaining, or repairing an existing software application.

When changing existing source files for an existing software application, however, it would be impractical or otherwise undesirable to reprocess all of the existing source files in a subsequent make process, particularly when only a relatively small number of the source files have been changed. Consequently, many existing make tools include functionality for tracking changes made to source files. The intended result of such functionality is that, during a subsequent reprocessing of the source files by the make tool, only the changed source files (and associated dependencies and intermediate target files) will be reprocessed in order to regenerate executable code for the updated software application.

However, such change tracking for source files is not always sufficiently accurate or reliable. In some scenarios, for example, it may occur that some source files which have not actually been altered since a previous make operation are incorrectly included for reprocessing during a current make operation. In these and other scenarios, the resulting make operations may become unnecessarily burdensome and frustrating, and may consume time and other resources in an inefficient and undesirable manner.

SUMMARY

According to on general aspect, a system may include instructions recorded on a non-transitory computer-readable storage medium, and executable by at least one processor. The system may include a request handler configured to cause the at least one processor to receive a request for a make operation for generating executable code from a plurality of source files and associated dependences there between, the source files and associated dependences having been previously utilized to generate a previous version of the executable code. The system may further include a hash comparator configured to cause the at least one processor to determine, for a selected source file, that a current hash value corresponding to current content of the selected source file is different from a previous hash value corresponding to previous content of the selected source file during the previous utilization, and further configured to cause the at least one processor to initiate execution of the make operation using the current content of the selected source file, based on the difference between the current hash value and the previous hash value.

According to another general aspect, a computer-implemented method for executing instructions stored on a computer readable storage medium may include receiving a request for a make operation for generating executable code from a plurality of source files and associated dependences there between, the source files and associated dependences having been previously utilized to generate a previous version of the executable code. The method may further include determining, for a selected source file, that a current hash value corresponding to current content of the selected source file is different from a previous hash value corresponding to previous content of the selected source file during the previous utilization, and initiating execution of the make operation using the current content of the selected source file, based on the difference between the current hash value and the previous hash value.

According to another general aspect, a computer program product may be tangibly embodied on a non-transitory computer-readable storage medium and may include instructions that, when executed by at least one computing device, are configured to cause the at least one computing device to receive a request for a make operation for generating executable code from a plurality of source files and associated dependences there between, the source files and associated dependences having been previously utilized to generate a previous version of the executable code. The instructions, when executed, may further cause the at least one computing device to determine, for a selected source file, that a current hash value corresponding to current content of the selected source file is different from a previous hash value corresponding to previous content of the selected source file during the previous utilization, and initiate execution of the make operation using the current content of the selected source file, based on the difference between the current hash value and the previous hash value.

The details of one or more implementations are set forth in the accompanying drawings and the description below. Other features will be apparent from the description and drawings, and from the claims.

DETAILED DESCRIPTION

Figure 1:
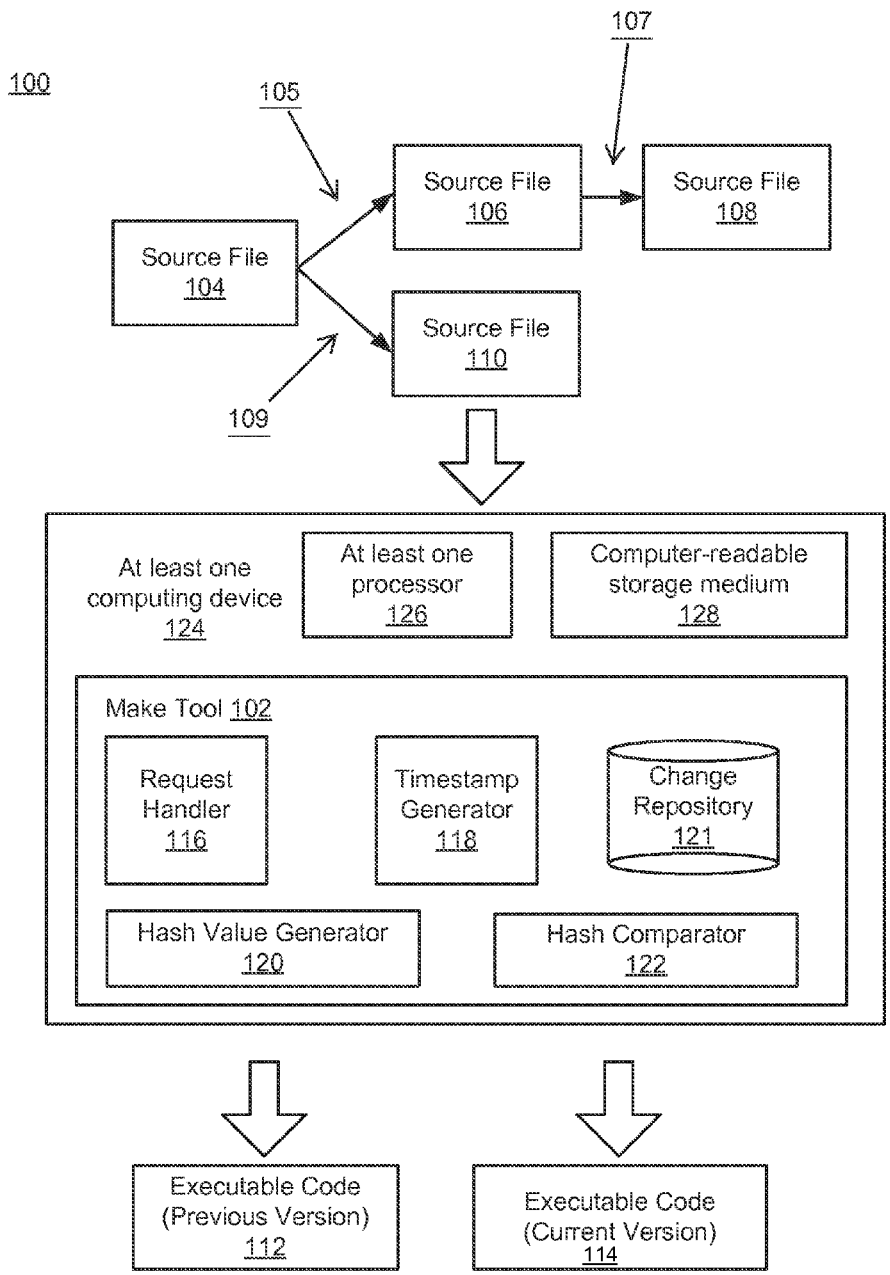
FIG. 1 is a block diagram of a system for hash-based change tracking for software make operations.

FIG. 1 is a block diagram of a system 100 for hash-based change tracking, for use in conjunction with a make tool 102. As described in detail herein, the make tool 102 is enabled to execute make operations in conjunction with providing accurate and reliable change tracking. As a result, operations of the make tool 102 are highly efficient, resulting in a convenience, and otherwise good use of resources, of a user of the system 100.

More specifically, as illustrated in the example of FIG. 1, the make tool 102 may be understood to be operable to utilize various source files, represented conceptually in the example of FIG. 1 as the source files 104, 106, 108, and 110. In the example of FIG. 1, the source files 104, 106, 108, 110 are illustrated as being linked to one another by way of dependencies 105, 107, 109. Specifically, as shown, the dependency 105 is illustrated as connecting the source files 104, 106, while the dependency 107 links source files 106, 108. Finally, in the example, the dependency 109 links the source files 104, 110. Of course, in the example of FIG. 1, the source files 104, 106, 108, and 110, along with the dependencies 105, 107, 109, are intended merely to represent a simplified, partial view of potential source files that might potentially be operated upon by the make tool 102. In actual implementations of the system 100, source files operated upon by the make tool 102 might number into the thousands, or more, and may be linked in a complex manner.

Further in the example of FIG. 1, it is assumed for the sake of the present description that the make tool 102 previously compiled/assembled executable code 112, utilizing then-existing versions of the source files 104, 106, 108, 110. As may be appreciated, the executable code 112 may be associated with, e.g., database-related applications, enterprise resource planning applications, customer relationship management applications, or supply chain management applications, to name a few examples. Sometime after this construction of the executable code 112, it is further assumed that the user of the system 100 has made some change to one or more of the source files 104, 106, 108, 110, and has thereafter initiated further operations of the make tool 102, with the intent of generating corresponding executable code 114.

In other words, FIG. 1 illustrates example implementations in which the make tool 102 previously used earlier versions of the source files 104, 106, 108, 110 to generate the executable code 112, which may thus also be referred to as a previous version of the executable code. Following intervening changes to one or more of the source files 104, 106, 108, 110, the make tool 102 utilizes current versions of the source files 104, 106, 108, 110 to generate the executable code 114, which may thus be referred to herein as a current version of the executable code.

As referenced above, by tracking any intervening changes to one or more of the source files 104, 106, 108, 110 that may occur during a time period between generation of the previous version of the executable code 112 and a current generation of the current version of the executable code 114, the make tool 102 may ensure that the current version of the executable code 114 is generated in a fast and efficient manner. More particularly, to track such changes, the make tool 102 compares actual content of each the source files 104, 106, 108, 110, in conjunction with generating the current version of the executable code 114, with corresponding content that existed at a time of generation of the previous version of the executable code 112. For example, the make tool 102 might compare a hash value calculated using current content of the source file 106, for comparison thereof against a previously-calculated hash value that was generated using content of the source file 106 at a time of generation of the previous version of the executable code 112. By comparing the current and previous hash values, the make tool 102 may quickly and accurately determine whether content of the source file 106 has actually changed in the time interval since generation of the previous version of the executable code 112 occurred.

In this regard, the term hash value should be understood to refer to a value generated using an appropriately-selected hash function. Such hash functions, generally speaking, refer to algorithms designed to map arbitrary or variable-sized content into fixed sized integers, in a manner that ensures with high probability that the resulting mapping is unique or nearly unique. Such hash functions, by themselves, are known, and any suitable hash function or similar algorithm may be used in the system 100 of FIG. 1. For example, the cryptographic secure hash algorithm (SHA) 1 algorithm, the SHA3, the SHA 256, or the Whirlpool hash function also may be used.

Thus, if the make tool 102 determines that the source file 106 is not changed, the make tool 102 will not include the source file 106 in processing operations associated with generating the current version of the executable code 114 (unless required for a different reason, such as a detected change to an upstream source file, such as the source file 104). On the other hand, if the content of the source file 106 has been changed, then the make tool 102 may proceed to include the source file 106, and any downstream source files, such as the source file 108, in current make operations associated with generating the current version of the executable code 114. In this way, the make tool 102 avoids needlessly including unchanged source files when executing make operations associated with generating the current version of the executable code 114.

In the example of FIG. 1, the make tool 102 is illustrated as including a number of components 116-122, which are included in the make tool 102 in conjunction with providing the features and functions referenced above, and which are described in detail below, including with respect to the example operations of the FIGS. 2 and 3. Of course, the make tool 102 should be understood to include various other components which might normally be associated with generating the executable code 112, 114, where such components are not explicitly illustrated in FIG. 1, or otherwise described herein, except as may be necessary or helpful in understanding example operations of the system 100 of FIG. 1.

For example, although not explicitly illustrated, the make tool 102 may generally have access to a repository or other source location configured to store a make file associated with the source files 104-110 and the executable code 112, 114. As is known, such a make file, also referred to as a build file, may refer to files which specify the exact manner in which the make tool 102 is intended to utilize the source files 104-110 to construct the executable code 112-114.

Thus, notwithstanding any specific examples or terminology used herein, which are intended merely to be illustrative and non-limiting, the make tool 102 should be understood to represent virtually any software development utility configured to transform source files into corresponding target results, including the compiling and assembly of executable code. Therefore, the make tool 102 should not be considered to be limited to representing any particular type of existing make tool, and, similarly, should not be considered to be limited to any particular type of programming language, or other aspect or characteristic of the source files 104, 106, 108, 110. Consequently, ancillary details of example implementations of the make tool 102 may not be described herein in detail, such as the inclusion of associated libraries when generating the executable code 112, 114, but should be understood to be present, where appropriate for a particular example implementation.

Further, as may be appreciated from the above description, the example of FIG. 1 assumes that the user of the system 100 has appropriate access to any software development tools necessary to implement desired changes with respect to one or more of the source files 104, 106, 108, 110. For example, the make tool 102 may itself be operable to enable the user of the system 100 to execute a desired change in content of a desired source file. In alternate implementations, in which a separate software development tool is utilized, the make tool 102 may be configured to monitor operations thereof which may be related to potential changes to one or more of the source files 104, 106, 108, 110, so that the make tool 102 may track such source file changes, in the manners described herein.

In the example of FIG. 1, the make tool 102 is illustrated as including a request handler 116, which may be configured to receive virtually any defined request that may be received from the user of the system 100, perhaps by way of a corresponding, suitable graphical user interface (not shown in FIG. 1). For example, as just referenced, the request handler 116 may be configured to receive requests associated with potential changes to a specified source file, or otherwise related to monitoring such source file changes. In other examples, the received request may be related to an initiation or execution of make operations of the make tool 102, such as a request to initiate generation of the current version of the executable code 114 (and related procedures). In still other examples, the request handler 116 may receive requests associated with configuring, or otherwise maintaining a status of, the make tool 102.

Also in FIG. 1, the make tool 102 is illustrated as including a timestamp generator 118, which may be configured to update a current timestamp of individual source files, in conjunction with one or more types of operations that might be executed with respect thereto. For example, the timestamp generator 118 may be configured to update a timestamp of a particular source file, in conjunction with an access of the source file, an update to the content of the source file, or any use thereof. In a particular example, the user of the system 100 might update the source file 110, whereupon the timestamp generator 118 may provide a timestamp specifying the time at which the updated question occurred. In such scenarios, then, the resulting timestamp represents a time at which a current version of a corresponding source file was created.

In additional or alternative example implementations, however, it may be necessary or desirable for the timestamp generator 118 to provide timestamps in other scenarios. For example, in some implementations, the make tool 102 may be implemented as a distributed system, in which multiple users may be permitted to access the source files 104, 106, 108, 110. In such scenarios, for example, the timestamp generator 118 might generate a new timestamp in reaction to switching between source file versions in parallel development branches of the distributed make tool, so that the corresponding source files are assigned a current timestamp, even if content of the source files in question has not changed. Similarly, current timestamps may be assigned in conjunction with switching between various, historic versions of a source file. Thus, in these and other scenarios, it may be appreciated that the timestamp generator 118 may operate to assign a new, current timestamp to a particular source file, even when content of the source file has not changed.

Thus, the timestamp generator 118 may be understood to include a monitoring function, in that the timestamp generator 118 monitors any processing of relevant source files, and, upon detection of pre-defined types of operations, as referenced above, assigns a timestamp to a corresponding source file. Similarly, a hash value generator 120 may be configured to monitor, or otherwise be aware of, processing of the source files 104, 106, 108, 110, and/or the dependencies 105, 107, 109. In conjunction with detection of such processing, the hash value generator 120 may be configured to generate a corresponding hash value for a relevant source file. The resulting hash value effectively provides a representation of content of the source file in question, after completion of the associated processing thereof.

Then, a change repository 121 is utilized to store, for each source file, one or more corresponding timestamps and hash values. In other words, for example, in a simplified example, the change repository 121 might store, for the source file 104, a timestamp and hash value associated with the source file 104 at a time of generation of the previous version of the executable code 112. In the example, the change repository 121 might also store a current timestamp and hash value for the source file 104, where the current version of the source file 104 is evaluated for potential reprocessing thereof in the context of generating the current version of the executable code 114.

In these and similar examples, a hash comparator 122 may be configured to compare a current hash value of the source file 104 with a previous hash value associated therewith, and obtained from the change repository 121. If the hash values are the same, then the make tool 102 will not be required to reprocess the source file 104 in conjunction with generating the current version of the executable code 114. On the other hand, if the hash values are different, then such a difference would reflect an actual change in content of the source file 104 that occurred during a time interval since generation of the previous version of the executable code 112, in which case the make tool 102 will be required to reprocess the (updated version of) the source file 104, along with some or all of any of the downstream dependencies and source files of the source file 104.

As may be appreciated, such hash values may be calculated quickly, and sufficiently and uniquely (or nearly uniquely), and may be compared against one another quickly and reliably. Consequently, the hash comparator 122 may quickly and reliably determine whether content of one or more source files has been changed. In the example implementations, as described in more detail below with respect to FIG. 3, operations of the hash comparator 122 may be further optimized using timestamps provided by the timestamp generator 118. In particular, as described, the hash comparator 122 may avoid making a hash value comparison for any source file whose associated timestamp has not been changed since the generation of the previous version of the executable code 112, on the presumption that such a lack of change and a timestamp of the source file indicates that no intervening processing of the source file has occurred which may have the content of the source file. Similarly, the hash value generator 120 may be optimized by generating a hash value only for source files that have received a new timestamp.

From the above description, the make tool 102 should be understood to represent, include, or interact with, a source control system (not specifically labeled as such in FIG. 1) that might include or utilize the components 116-122 of FIG. 1. Using the components 116-122, the make tool 102 provides source control in an effective, efficient, and reliable manner.

In the example of FIG. 1, the make tool 102 is illustrated as being executed using at least one computing device 124, which itself is illustrated as including at least one processor 126 and non-transitory computer-readable storage medium 128. Thus, the at least one computing device 124 may be understood to represent virtually any computing device that might suitably be utilized to execute the make tool 102, including any various hardware or software components thereof that are not explicitly illustrated in the simplified example of FIG. 1.

For example, the at least one computing device 124 may represent two or more computing devices, in communication with one another by way of appropriate network interface. For example, as referenced above, the make tool 102 may be implemented in a distributed fashion, in which case multiple instances of the make tool 102, or portions thereof, may be implemented using two or more distributed computing devices.

Further, whether implemented on a single computing device, or in a distributed fashion, the make tool 102 may benefit from parallel processing provided by two or more appropriate semi-conductor, hardware processors, as represented by the at least one processor 126. Meanwhile, the non-transitory compute readable storage medium 128 may represent virtually any known or future storage medium that may be used to store data or instructions. For example, a computer readable storage medium 128 may represent first storage for storing executable instructions for implementing the make tool 102, while a separate storage may be used to implement the change repository 121.

Also in FIG. 1, the make tool 102 is illustrated as including the various components 116-122, which are themselves illustrated as separate, individual components. In additional or alternative implementations, one or more of the components 116-122 may be implemented outside of the immediate contacts of the make tool 102, and may be accessed by the make tool 102 as needed to implement the various features and functions described herein. Moreover, in various implementations, any two or more of the various components of the make tool 102 may be combined for implementation as a single component, while, alternatively, any individual component may be executed using two or more subcomponents.

Figure 2:
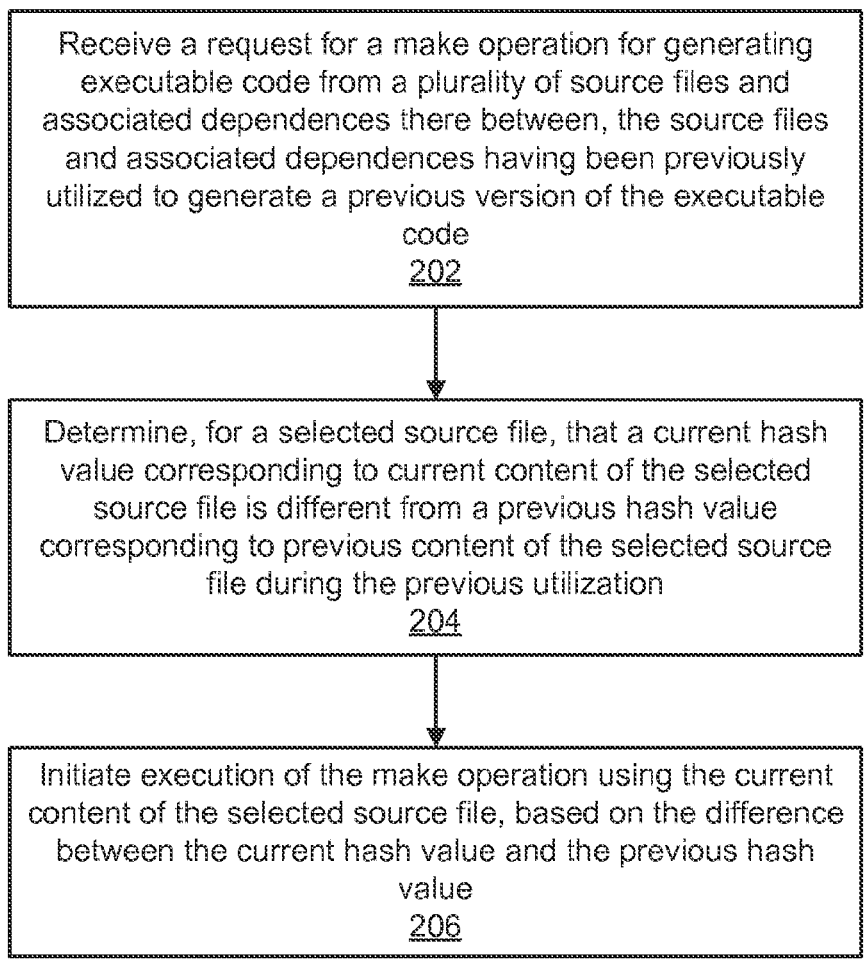
FIG. 2 is a flowchart illustrating example operations of the system of FIG. 1.

FIG. 2 is a flowchart 200 illustrating example operations of the system 100 of FIG. 1. In the example of FIG. 2, operations 202-206 are illustrated as separate, sequential operations. However, in additional or alternative implementations, additional operations may be included or substituted, and any two or more such operations may be executed in a partially or completely overlapping or parallel manner, or in a nested, iterative, branched, or looped fashion.

In the example of FIG. 2, a request may be received for a make operation for generating executable code from a plurality of source files and associated dependencies therebetween, the source files and associated dependencies having been previously utilized to generate a previous version of the executable code (202). For example, the request handler 116 of the make tool 102 may receive a request to generate the current version of the executable code 114, based on the source files 104, 106, 108, 110, and associated dependencies 105, 107, 109, where, as described, it is assumed that the previous version of the executable code 112 was previously generated by the make tool 102, using the associated source files and dependencies.

For a selected source file, it may be determined that a current hash value corresponding to current content of the selected source file is different from a previous hash value corresponding to previous content of the selected source file during a previous utilization (204). For example, the hash comparator 122 may be configured to consult the change repository 121 to determine that a currently-existing hash value for the source file 104 is different from a previously-generated and stored hash value that existed at the time of generation of the previous version of the executable code 112.

Execution of the make operation may be initiated using the current content of the selected source file, based on the difference between the current hash value and the previous hash value (206). For example, the hash comparator 122 may be configured to provide the make tool 102 with an identification of the changed source file(s) and dependenc(ies), for use by the make tool 102 in generating the current version of the executable code 114.

Figure 3:
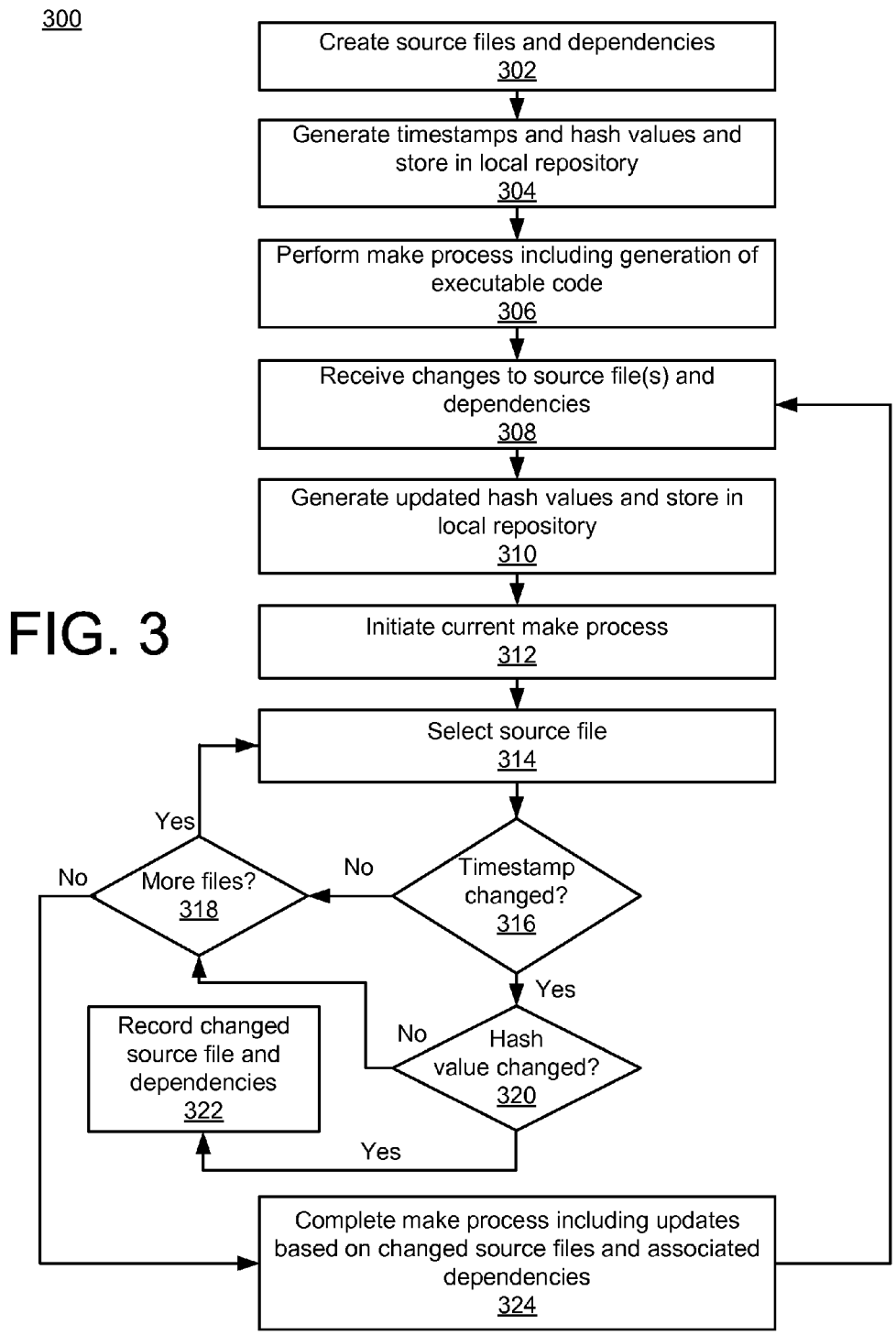
FIG. 3 is a second flowchart illustrating more detailed example operations of the system of FIG. 1.

FIG. 3 is a flowchart 300 illustrating more detailed example operations of the system 100 of FIG. 1. FIG. 3 illustrates an example in which source files are originally created and constructed for an initial generation of associated executable code. In other words, in the example of FIG. 3, it is assumed that the previous version of the executable code 112 represents a first, original version of the executable code.

Thus, in the example of FIG. 3, the various source files and associated dependencies are created (302) by the user of the system 100. In association with the creation and storage of the various source files and dependencies, the timestamp generator 118 and the hash value generator 120 may generate corresponding timestamps and hash values for storage thereof in a local repository (304), such as the change repository 121. As may be appreciated, the one or more users of the system 100 may take various actions with respect to processing individual source files, or characteristics thereof, where such processing may be pre-defined as being associated with a requirement for a corresponding timestamp, or updated hash value. In any case, the change repository 121 may be utilized to store individual timestamps and hash values for each source file in question.

In addition to generating timestamps and hash values for individual source files, the hash value generator 120 may be configured to provide concatenated hash values corresponding to dependencies between two or more source files, perhaps in conjunction with a creation or modification of a relevant dependency. For example, concatenated hash values of some or all source files upon which a particular source file depends may be calculated. In this way, dependencies or other relationships between source files may be uniquely represented, in the same manner in which individual source files themselves are represented. As a result, and as described in detail below, such concatenated hash values may similarly be used to detect changes in dependencies that may be implemented during a time interval between generation of the executable code 112 and the executable code 114.

The make tool 102 may then perform the associated make process, including generation of the original executable code 112 (306). The resulting, original executable code 112 may thus be deployed for its intended use.

Over time, changes to individual source files, and/or dependencies therebetween, may be received (308). In association with such processing, updated hash values may be generated for storage in the local repository (310), e.g., the change repository 121.

As referenced above, and described in detail below, the timestamp generator 118 may be utilized to optimize operations of the hash value generator 120 in assigning updated hash values. For example, generation of a new timestamp for a particular source file may serve as a possible trigger for operation of the hash value generator 120 in generating a corresponding new hash value. In additional or alternative examples, hash values may be generated upon a detected access and/or edit of a particular source file.

Further, as also referenced above, the hash value generator 120 may be configured to generate two or more concatenated hash values which correspond to hash values for two or more dependent source files. In such scenarios, of course, the resulting concatenated hash values may also be stored using the change repository 121.

At some point in time, a new, current make process may be initiated (312). For example, as described, the request handler 116 may receive a request to initiate a new, current make process.

In conjunction therewith, the hash comparator 122 may begin its above-described hash comparison operations by initially selecting a source file (314). That is, in the example implementations, the hash comparator 122 may select a particular source file, or, in alternate implementations, the hash comparator 122 may select a particular dependency, such as the dependency 105 of FIG. 1, and thereby identify hash values associated with the individual, connected source files (e.g., the source files 104, 106) and/or concatenated hash values representing the dependency between the source files in question. That is, the hash comparator 122 may access the change repository 121 to access the relevant source file, dependency, and associated hash value(s) and timestamp(s).

If a corresponding timestamp of the selected file has not been changed (316) since the previous generation of the original executable code 112, then the hash comparator 122 may proceed to determine whether any source files remain for further inspection thereof (318). If so, then the next source file may be selected (314), and its corresponding timestamp may be examined for any changes thereto (316). As a result of the iterative loop of operations 314, 316, 318, the hash comparator 122 may effectively be optimized by being limited to considering hash values of only those source files (and associated dependencies) that have changed timestamps associated therewith, thereby potentially eliminating a need to inspect a significant number of the source files in question for actual content changes. In other words, the implementation of FIG. 3 assumes that changed source files are a subset of changed timestamp source files, which are themselves a subset of the source files as a whole.

For source files and/or dependencies whose timestamps values have changed (316), the hash comparator 122 may proceed to determine whether a corresponding hash value of the source file and/or dependency in question has changed (320). That is, as may be appreciated, the hash comparator 122 may retrieve the current and previous hash values for the source file in question from the change repository 121.

If the hash value is not changed (320), then the hash comparator 122 may proceed again to determine whether more source files remain for inspection thereof (318). On the other hand, if the hash value in question has changed (320), then the hash comparator 122 may be configured to record an identity of the changed source file and/or relevant dependencies (and potentially dependent source files) associated therewith (322). For example, the source filed and dependencies identified as having experienced changes may be marked as such within the change repository 121.

Once no more source files or associated dependencies remain for inspection (318), then the make tool 102 may proceed with completion of the requested, current make process, including generating the current version of the executable code 114, based on the thus-detected changed source files and associated dependencies. In this way, the make process triggers the processing of only those source files (and associated dependent source files and dependencies) that have actually changed in content during an interval since a most recent make operation, so that minimal reprocessing is required to create all intermediate and final target files. Consequently, the make tool 102 ensures that changes made to a relatively small number of source files will not require large scale processing of the source files as a whole.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Non-transitory information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for executing instructions stored on a computer readable storage medium, the method comprising:
receiving a request for a make operation for generating executable code from a plurality of source files and associated dependences there between, the source files and associated dependences having been previously utilized to generate a previous version of the executable code;
determining, for a selected source file, that a first timestamp associated with current content of the selected source file has changed since the previous utilization;
determining, for the selected source file and based on the change of the first timestamp, that a current hash value corresponding to the current content of the selected source file is different from a previous hash value corresponding to previous content of the selected source file during the previous utilization;
determining, for a second selected source file, that a second timestamp associated with current content of the second selected source file has not changed since the previous utilization; and
initiating execution of the make operation using the current content of the selected source file, based on the difference between the current hash value and the previous hash value, including excluding the second selected source file from re-processing thereof during the make operation, based on the second timestamp not having changed since the previous utilization.

2. The method of claim 1, comprising:
generating the previous hash value in conjunction with creation or modification of the previous content of the selected source file; and
generating the current hash value in conjunction with a modification of the previous content of the selected source file to obtain the current content of the selected source file.

3. The method of claim 1, comprising
storing, in a change repository and for the selected source file, a previous timestamp and the previous hash value, both assigned in conjunction with creation or modification of the previous content of the selected source file; and
storing, for the selected source file, the first timestamp and the current hash value, both assigned in conjunction with creation or modification of the current content of the selected source file.

4. The method of claim 1, comprising generating concatenated hash values corresponding to at least two dependent source files of the plurality of source files, in conjunction with a creation or modification of at least one dependency between the at least two source files.

5. A system comprising:
a non-transitory computer-readable storage medium on which instructions are recorded; and
at least one processor configured to implement the instructions, the system including
a request handler configured to cause the at least one processor to receive a request for a make operation for generating executable code from a plurality of source files and associated dependences there between, the source files and associated dependences having been previously utilized to generate a previous version of the executable code; and
a hash comparator configured to cause the at least one processor to determine, for a selected source file, that a current hash value corresponding to current content of the selected source file is different from a previous hash value corresponding to previous content of the selected source file during the previous utilization, and further configured to cause the at least one processor to initiate execution of the make operation using the current content of the selected source file, based on the difference between the current hash value and the previous hash value,
wherein the hash comparator is further configured to determine that a first timestamp associated with the current content of the selected source file has changed since the previous utilization before selecting the selected source file for determining that the current hash value of the selected source file is different from the previous hash value of the selected source file, and
further wherein the hash comparator is configured to determine that a second selected source file is associated with a second timestamp that has not been updated since the previous utilization, and to thereafter exclude the second selected source file from re-processing thereof during the make operation.

6. The system of claim 5, comprising a timestamp generator configured to cause the at least one processor to assign the first timestamp to the selected source file, in conjunction with a use thereof.

7. The system of claim 5, comprising a hash value generator configured to cause the at least one processor to generate the previous hash value in conjunction with creation or modification of the previous content of the selected source file, and further configured to cause the at least one processor to generate the current hash value in conjunction with a modification of the previous content of the selected source file to obtain the current content of the selected source file.

8. The system of claim 5, comprising a change repository configured to store, for the selected source file, a previous timestamp and the previous hash value, both assigned in conjunction with creation or modification of the previous content of the selected source file, and further configured to store, for the selected source file, the first timestamp and the current hash value, both assigned in conjunction with creation or modification of the current content of the selected source file.

9. The system of claim 5, comprising a change repository configured to store the selected source file, along with remaining source files of the plurality of source files that are associated with changed hash values since the previous utilization, for re-processing thereof during the make operation.

10. The system of claim 5, comprising a change repository configured to store the selected source file, along with source files that are dependent thereon, for re-processing thereof during the make operation.

11. The system of claim 5, comprising a hash generator configured to cause the at least one processor to generate concatenated hash values corresponding to at least two dependent source files of the plurality of source files, in conjunction with a creation or modification of at least one dependency between the at least two source files.

12. A computer program product, the computer program product being tangibly embodied on a non-transitory computer-readable storage medium and comprising instructions that, when executed by at least one computing device, are configured to cause the at least one computing device to:
- receive a request for a make operation for generating executable code from a plurality of source files and associated dependences there between, the source files and associated dependences having been previously utilized to generate a previous version of the executable code;
- determine, for a selected source file, that a first timestamp associated with current content of the selected source file has changed since the previous utilization;
- determine, for the selected source file and based on the change of the first timestamp, that a current hash value corresponding to the current content of the selected source file is different from a previous hash value corresponding to previous content of the selected source file during the previous utilization;
- determine, for a second selected source file, that a second timestamp associated with current content of the second selected source file has not changed since the previous utilization; and
- initiate execution of the make operation using the current content of the selected source file, based on the difference between the current hash value and the previous hash value, including excluding the second selected source file from re-processing thereof during the make operation, based on the second timestamp not having changed since the previous utilization.

13. The computer program product of claim 12, wherein the instructions, when executed, are further configured to:
- generate the previous hash value in conjunction with creation or modification of the previous content of the selected source file; and
- generate the current hash value in conjunction with a modification of the previous content of the selected source file to obtain the current content of the selected source file.

14. The computer program product of claim 12, wherein the instructions, when executed, are further configured to:
- store, in a change repository and for the selected source file, a previous timestamp and the previous hash value, both assigned in conjunction with creation or modification of the previous content of the selected source file; and
- store, for the selected source file, the first timestamp and the current hash value, both assigned in conjunction with creation or modification of the current content of the selected source file.

15. The computer program product of claim 12, wherein the instructions, when executed, are further configured to:
- generate concatenated hash values corresponding to at least two dependent source files of the plurality of source files, in conjunction with a creation or modification of at least one dependency between the at least two source files.

* * * * *